July 20, 1943.    R. R. WELCH    2,324,748
DRILL
Filed Aug. 14, 1941
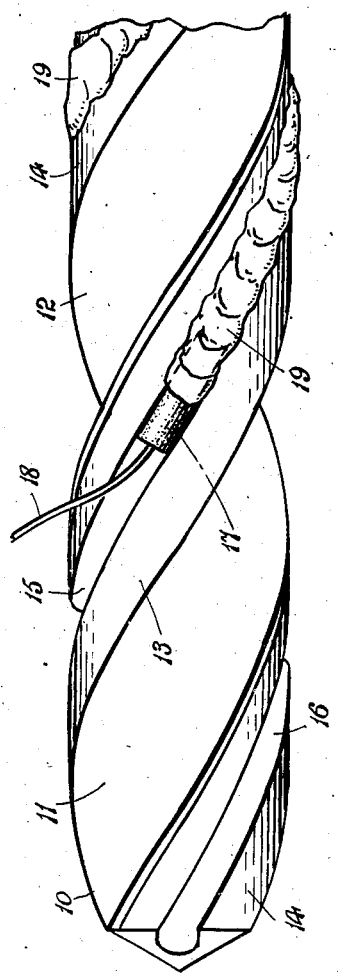
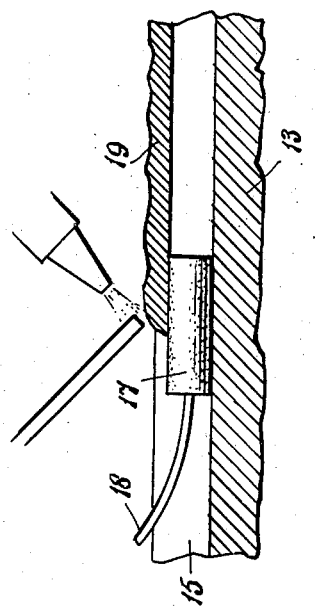
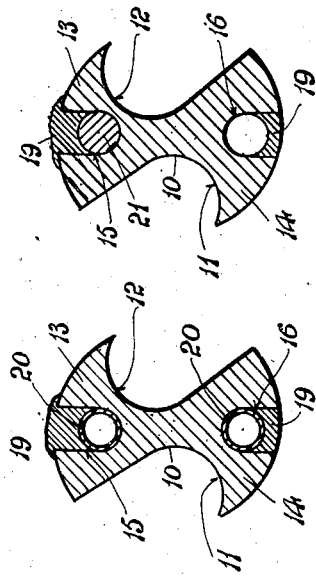
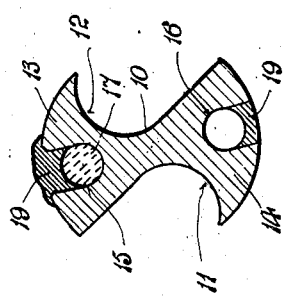
Rodney R. Welch
INVENTOR.
BY Stanley Lightfoot Patented July 20, 1943

2,324,748

UNITED STATES PATENT OFFICE 2,324,748

DRILL

Rodney R. Welch, Detroit, Mich.

Application August 14, 1941, Serial No. 406,767

4 Claims. (Cl. 76—108)

This invention relates to twist drills in which the body is spirally grooved, with resultant spiral lands between the grooves, and has especial reference to production of such drills of the oil hole type, wherein spiral oil holes or ducts are provided through the solid metal of the lands of the drills so that oil may be fed through such ducts to the point of the drill.

Where such drills are produced by the well known twisting process, the oil holes may be readily drilled in the lands while they are yet straight so that they will eventually follow the spiral form of the lands when the drills are eventually twisted in the process of formation. However, in a drill that has already been twisted or in a drill in which the grooves have been machined in a spiral manner out of a solid blank, it is obvious that drilling the lands to provide such oil ducts cannot be readily accomplished; and the principal object of the present invention, is therefore, to provide a method of forming enclosed ducts in the spiral lands to a twist drill in a manner commercially satisfactory and without involving excessive cost.

A further object of the said invention is to provide for the formation of oil holes in the spiral lands of a drill by machining or forming spiral grooves in the outer surfaces of the lands and thereafter filling in or roofing the outer portions of the grooves with weld material in such manner that a completely walled duct will be formed within each land of the drill, which dirll may thereafter be ground or machined to its final form, thus removing excess weld material from the said lands.

A further object is to provide means for insuring the maintenance of a clear walled passage through the bed of the groove of the land when the outer part of the groove is filled with weld material.

A still further object is to provide for the filling of the outer part of the groove of the land with weld material in a progressive manner along the groove and over a progressively moving plug of a material which resists adhesion of the weld material thereto, the progression of the plug along the groove being timed to conform to the progression of the welding operation.

A still further object of the invention is to provide for the formation of a walled oil duct in the land of the drill by providing, in a groove formed in the said land, a filler defining at least the outer part of the wall of said duct and thereafter covering said filler with weld material; and, more particularly, it is proposed to utilize as the duct defining means a tube laid in the bed of the spiral groove of the land sealed in the said groove by weld material filling the balance of the outer part of the groove.

A still further object of the said invention is to provide for the formation of oil holes in the lands of a spiral drill by providing grooves in the said lands following the spiral form thereof, laying in the beds of said grooves spiral rods or wires of fusable material capable of temporarily withstanding the heat of the welding material, afterwards applied as a filling for the balance of the groove, but capable of being melted from the groove after the welding has been completed, as in the eventual heat-treatment of the drill, to leave walled ducts between the beds of the grooves and the weld material.

It is, of course, an object of the invention to provide a drill having oil ducts formed in the lands thereof in any of the manners heretofore referred to.

Still further objects or advantages subsidiary to the aforesaid objects, or resulting from the construction or operation of the invention as it may be carried into effect, will become apparent as the said invention is hereinafter further disclosed.

In further describing the said invention, by way of example, reference is made to the accompanying drawing, wherein:

Figure 1 is an elevation of part of a drill shown in process of having oil holes formed in the lands thereof;

Figure 2 is a transverse section of the same, the upper part of the figure showing the formation of an oil hole before final removal of excess material from the outer surface of the drill, and the lower part of the figure, showing the land as finally completed with the oil hole therein;

Figure 3 is a longitudinal sectional development of part of the drill taken through the grooved land, and illustrating the progressive method of forming the oil hole;

Figure 4 is a similar view to Figure 2, illustrating a modification of the method of forming the oil hole; and Figure 5 is a similar view to Figure 2, illustrating another modified method of forming an oill hole.

Similar characters of reference indicate similar parts in the several figures of the drawing.

Referring first to Figures 1, 2, and 3, the drill, generally numbered 10, is shown as being formed with spiral grooves 11 and 12, resulting in the formation of the spiral lands 13 and 14. These lands are grooved, as at 15 and 16, the grooves being preferable of greater depth than width and having semi-circular beds.

17 is a plug of a diameter substantially conforming to the width of the groove and of a length which will permit of its being moved along the bed of the groove; and this plug is of a material which resists adhesion of weld material thereto, such, for instance, as the material commercially known as brown carbon. 18 is simply a wire or other means by which said plug may be drawn along the groove as required.

According to the method shown in Figures 1, 2, and 3, the plug 17 is started at one end of the groove and weld material 19 is applied above the plug, as shown in Figure 3, in a progressive manner as the said plug is moved along the groove, whereby the plug prevents the complete filling of the groove with weld material, so that the said weld material is caused to complete the enclosing of an oil hole in the land by bridging the groove in separated relation to the bed thereof, as will be readily understood. The weld material 19, of course, becomes welded to the sides of the groove and thereby becomes to all intents and purposes an integral part of the land, it being preferred that an excess of material be allowed to flow over the edges of the groove to insure thorough filling of the outer part of the groove in the manner required; and this excess material is afterwards removed in the eventual grinding of the drill to its final correct form.

In applying the weld material 19 to the grooves of the lands, it may be permitted to completely close the opposite ends of the groove so that the oil holes formed therein will be closed against the ingress of foreign matter until such time as the drill is ground, when, of course, the ends of the oil holes may be readily opened during such operation.

While I prefer the method hereinbefore outlined, I may form the oil holes by providing the grooves in the lands as already stated, and inserting in the beds thereof fillers defining at least the outer part of the walls of the ducts, as for instance, shown in Figure 4, wherein tubes 20 defining the entire wall of each duct are laid in the spiral beds of the said grooves. These tubes 20 are thereafter sealed in position by the weld material 19. As indicated in Figure 5, I may lay in the bed of each groove a correspondingly spiral wire filler 21, such as of copper or a fusable alloy having a melting point capable of temporarily withstanding the heat of the weld material 19 with which the balance of the groove is afterward filled. This wire is capable however, of being melted from the groove after the welding has been completed, as in the eventual heat treatment of the drill. Thus, upon such eventual melting of wire 21 from the groove the required oil hole will remain.

It is understood that while the invention is primarily intended to overcome the difficulties met in forming oil holes in twist drills, it need not be necessarily limited to such drills as the method employed may be quite advantageously used in drills having straight lands, as in core drills or reamers. Furthermore, while herein, and in the claims, the groove is referred to for simplicity of language as being formed in the lands of the drill or tool, the term is not intended to be strictly limited to that particular part of the tool as in some cases the lands are quite narrow and it may be preferred to form the oil grooves in the beds of the clearance grooves or recesses between the lands. This latter condition would apply in the case of most reamers.

This invention may be developed within the scope of the following claims without departing from the essential features of the said invention, and it is to be desired that the specification and drawing be read as being merely illustrative of a preferred method of carrying out the said invention, and not in a strictly limiting sense.

What I claim is:

1. The method of producing an oil hole in the land of a drill, which comprises forming a groove in the outer surface of the said land, drawing an abbreviated filler in the form of a plug progressively along the bed of said groove, said filler being of a refractory material which resists adhesion of weld material thereto, progressively roofing said groove with weld material over said filler as said filler is moved along said groove, the progression of the welding and the movement of said filler being substantially at equal speed, and thereafter grinding off excess material from the outer surface of said land.

2. The method of producing an oil hole in the land of a drill, which comprises forming a groove in the outer surface of the said land, drawing a carbon plug along the bed of said groove, progressively roofing said groove with weld material over said plug as said plug is moved along said groove at a speed substantially that of the welding progression, and thereafter grinding off excess material from the outer surface of the land.

3. The method of producing an oil hole drill from a blank having a land of spiral form, which comprises forming a spiral groove in the outer surface of the said land, drawing an abbreviated filler in the form of a plug progressively along the bed of said groove, said filler being of a material which resists adhesion of weld material thereto, progressively roofing said groove with weld material over said filler as said filler is moved along said groove at substantially the speed of the welding progression, and thereafter grinding off excess material from the outer surface of said land.

4. The method of producing an oil hole drill from a blank having a land of spiral form, which comprises forming a spiral groove in the outer surface of the said land, drawing an abbreviated carbon plug along the bed of said groove, progressively roofing said groove with weld material over said plug as said plug is moved along said groove at substantially the speed of the welding progression, and thereafter grinding off excess material from the outer surface of the land.

RODNEY R. WELCH.